UNITED STATES PATENT OFFICE.

FRIEDRICH BOLEG, OF CANNSTATT, GERMANY, ASSIGNOR TO GESELLSCHAFT ZUR VERWERTUNG DER BOLEG'SCHEN WASSERLÖSLICHER MINERALÖLE UND KOHLENWASSERSTOFFE, GESELLSCHAFT MIT BESCHRÄNKTER HAFTUNG, OF BERLIN, A CORPORATION OF GERMANY.

PROCESS FOR THE PREPARATION OF WATER-SOLUBLE VASELINE.

No. 805,443.      Specification of Letters Patent.      Patented Nov. 28, 1905.

Application filed March 8, 1904. Serial No. 197,171.

*To all whom it may concern:*

Be it known that I, FRIEDRICH BOLEG, chemist, a subject of the King of Würtemberg, residing at Cannstatt, in the Kingdom of Würtemberg, Germany, have invented certain new and useful Improvements in Processes for the Preparation of Water-Soluble Vaseline; and I do hereby declare the following to be a full, clear, and exact description of the invention, such as will enable others skilled in the art to which it appertains to make and use the same.

The object of the present application consists of a process for the preparation of water-soluble vaseline and of vaseline capable of being compounded with water for technical and medicinal purposes.

For the preparation of the vaseline water-soluble mineral oils are made use of as a basis, which oils have been made water-soluble in the manner set out in detail in my application Serial No. 126,273. It may be stated here in brief that the mineral oils mixed with crude rosin-oil first undergo a washing and treatment with direct steam and are then mixed with an excess of caustic alkali solution. Then the alkaline mixture of oil after separation of the rosin-soap lye is subjected to an oxidation process by the introduction of air under pressure or ozone and finally subjected to a shorter or longer treatment under pressure of one to one and a half atmospheres at temperatures corresponding to this steam-pressure. Of the mineral oils rendered water-soluble in this manner about ten to fifteen per cent. is mixed at the lowest possible temperature (from 40° to 50° Celsius) with melted vaseline and the mixture allowed to cool with constant stirring. There is obtained in this manner a vaseline which can be easily dissolved in water or can be mixed easily therewith, whereby for certain purposes a great saving of vaseline is obtained.

Instead of using water-soluble mineral oils as the basis for mixture with the vaseline there may advantageously be employed water-soluble clear rosin-oils or rosin-oil watery solutions. These latter are obtained by boiling the crude rosin-oil with excess of caustic alkali solution with the application of direct steam and subjecting the alkaline rosin-oil mixture to a further treatment with air under pressure or ozone at temperatures from 95° to 110° Celsius until a clear solution is obtained.

What I claim, and desire to secure by Letters Patent, is—

1. The process of preparing water-soluble vaseline, which consists in adding to vaseline a water-soluble oil, intimately mixing and allowing to cool.

2. The process of preparing water-soluble vaseline, which consists in intimately mixing vaseline and ten to fifteen per cent. of water-soluble mineral oil.

3. The process of preparing water-soluble vaseline, which consists in intimately mixing with melted vaseline ten to fifteen per cent. of water-soluble oil at a low temperature and allowing to cool.

4. The process of preparing water-soluble vaseline, which consists in adding to melted vaseline ten to fifteen per cent. of water-soluble mineral oil at a temperature of 40° to 50° Celsius and intimately mixing while cooling.

In witness whereof I have hereunto set my hand in presence of two witnesses.

FRIEDRICH BOLEG.

Witnesses:
     ARTHUR VOGT,
     RICHARD SCHUMAN.